(12) United States Patent
Taga et al.

(10) Patent No.: US 11,001,964 B2
(45) Date of Patent: May 11, 2021

(54) TREATMENT AGENT AND INK SET

(71) Applicant: Brother Kogyo Kabushiki Kaisha, Nagoya (JP)

(72) Inventors: Yasuhiro Taga, Kani (JP); Keisuke Yuhara, Nagoya (JP); Mitsunori Maeda, Nagoya (JP); Shinpei Ito, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 383 days.

(21) Appl. No.: 16/059,472

(22) Filed: Aug. 9, 2018

(65) Prior Publication Data
US 2019/0100871 A1 Apr. 4, 2019

(30) Foreign Application Priority Data

Sep. 29, 2017 (JP) .............................. JP2017-192145

(51) Int. Cl.
*D06P 1/44* (2006.01)
*D06P 1/52* (2006.01)
*D06P 1/50* (2006.01)
*C09D 11/322* (2014.01)
*C09D 11/54* (2014.01)
*C09D 11/328* (2014.01)
*D06P 5/30* (2006.01)
*D06P 5/22* (2006.01)
*D06P 1/66* (2006.01)
(Continued)

(52) U.S. Cl.
CPC ............ *D06P 1/445* (2013.01); *C09D 11/322* (2013.01); *C09D 11/328* (2013.01); *C09D 11/38* (2013.01); *C09D 11/40* (2013.01); *C09D 11/54* (2013.01); *D06P 1/46* (2013.01); *D06P 1/48* (2013.01); *D06P 1/50* (2013.01); *D06P 1/5228* (2013.01); *D06P 1/5242* (2013.01); *D06P 1/5257* (2013.01); *D06P 1/5278* (2013.01); *D06P 1/5285* (2013.01); *D06P 1/655* (2013.01); *D06P 1/6553* (2013.01); *D06P 1/6556* (2013.01); *D06P 1/66* (2013.01); *D06P 5/002* (2013.01); *D06P 5/225* (2013.01); *D06P 5/30* (2013.01); *B41M 5/0017* (2013.01)

(58) Field of Classification Search
None
See application file for complete search history.

(56) References Cited

U.S. PATENT DOCUMENTS 5,609,671 A 3/1997 Nagasawa
5,837,045 A 11/1998 Johnson et al.
(Continued)

FOREIGN PATENT DOCUMENTS

JP H08-3498 A 1/1996
JP H08-39793 A 2/1996
(Continued)

*Primary Examiner* — Helene Klemanski
(74) *Attorney, Agent, or Firm* — Banner & Witcoff, Ltd.

(57) ABSTRACT

There is provided a treatment agent applicable to a recording surface of a recording medium which is recording paper or fabric. The treatment agent contains: a non-cationic sizing agent; and at least one cationic substance which is selected from the group consisting of: a cationic polymer capable of forming a flexible film in a case that the cationic polymer is dried, a cationic surfactant, a polyvalent metal salt and a polyvalent metal ion.

18 Claims, 4 Drawing Sheets

(51) Int. Cl.
*D06P 1/655* (2006.01)
*C09D 11/38* (2014.01)
*D06P 5/00* (2006.01)
*C09D 11/40* (2014.01)
*D06P 1/46* (2006.01)
*D06P 1/48* (2006.01)
*B41M 5/00* (2006.01)

(56) References Cited

U.S. PATENT DOCUMENTS

| | | | |
|---|---|---|---|
| 6,656,228 B1* | 12/2003 | Sherwin | D06P 1/48 |
| | | | 8/115.51 |
| 6,705,717 B1 | 3/2004 | Fujita et al. | |
| 8,016,404 B2 | 9/2011 | Kato et al. | |
| 8,840,715 B2* | 9/2014 | Ohishi | C09D 11/54 |
| | | | 106/31.43 |
| 10,569,569 B2* | 2/2020 | Taga | D06P 1/5285 |
| 10,774,468 B2* | 9/2020 | Ito | D06P 1/445 |
| 2003/0064206 A1 | 4/2003 | Koyano | B41M 5/0017 |
| | | | 428/195.1 |
| 2004/0119800 A1* | 6/2004 | Takada | C09D 11/40 |
| | | | 347/96 |
| 2005/0036018 A1* | 2/2005 | Yanagihara | D06P 5/30 |
| | | | 347/100 |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2008/0241398 A1 | 10/2008 | Kato et al. | |
| 2009/0229489 A1 | 9/2009 | Gu | |
| 2011/0054097 A1* | 3/2011 | Park | C09D 11/40 |
| | | | 524/201 |
| 2011/0102497 A1* | 5/2011 | Sato | D06P 5/30 |
| | | | 347/21 |
| 2013/0249996 A1* | 9/2013 | Saito | C09D 1/00 |
| | | | 347/21 |
| 2015/0251444 A1 | 9/2015 | Sayama et al. | |
| 2015/0299948 A1* | 10/2015 | Pan | D06P 5/225 |
| | | | 524/591 |
| 2015/0352877 A1* | 12/2015 | Niu | C09D 11/54 |
| | | | 428/32.34 |
| 2018/0291553 A1* | 10/2018 | Schimper | D06P 1/67341 |
| 2018/0311988 A1* | 11/2018 | Ito | B41M 5/0017 |
| 2019/0003115 A1* | 1/2019 | Ohashi | D06P 1/50 |
| 2019/0112493 A1* | 4/2019 | Yuhara | C09D 11/54 |
| 2019/0300742 A1* | 10/2019 | Ito | D06P 5/30 |
| 2019/0300743 A1* | 10/2019 | Ito | D06P 1/655 |
| 2019/0301084 A1* | 10/2019 | Ito | D06P 1/65131 |
| 2019/0301085 A1* | 10/2019 | Ito | D06P 5/30 |

FOREIGN PATENT DOCUMENTS

| | | |
|---|---|---|
| JP | 2000-290558 A | 10/2000 |
| JP | 2000-513396 A | 10/2000 |
| JP | 2008-524400 A | 7/2008 |
| JP | 2008-246821 A | 10/2008 |
| JP | 2009-515007 A | 4/2009 |
| JP | 2011-515535 A | 5/2011 |
| JP | 2015-168147 A | 9/2015 |

\* cited by examiner

TREATMENT AGENT AND INK SET

CROSS REFERENCE TO RELATED APPLICATION

The present application claims priority from Japanese Patent Application No. 2017-192145 filed on Sep. 29, 2017 the disclosure of which is incorporated herein by reference in its entirety.

BACKGROUND

Field of the Invention

The present invention relates to a treatment agent and an ink set.

Description of the Related Art

There is suggested a variety of kinds of printing apparatus having a paper medium printing mode for performing printing with respect to a paper medium and a textile printing mode for performing printing with respect to a cloth medium (fabric medium) and capable of performing printing with respect to both of the paper medium and the cloth medium (see, for example, Japanese Patent Application Laid-open No. 2015-168147 corresponding to United States Patent Application Publication No. US2015/0251444).

However, fabric (cloth) is generally washed (cleaned) by water, and thus a printed matter obtained by performing printing on the fabric is required to have an excellent water resistance. Further, during printing on a recording medium including a recording paper (recording paper sheet, recording sheet) and fabric, it is preferred that any warping (distortion) of the recording medium is suppressed and that excellent transportability (conveyance property) for the recording medium is realized.

In view of the above situation, an object of the present teaching is to provide a treatment agent which is applicable to a recording surface of a recording medium which is recording paper or fabric (textile), and which is capable of improving the transportability of the recording medium during the printing and the water resistance of the printed matter.

SUMMARY

According to a first aspect of the present teaching, there is provided a treatment agent applicable to a recording surface of a recording medium which is recording paper or fabric, the treatment agent including:

a non-cationic sizing agent; and at least one cationic substance which is selected from the group consisting of: a cationic polymer capable of forming a flexible film in a case that the cationic polymer is dried, a cationic surfactant, a polyvalent metal salt and a polyvalent metal ion.

According to a second aspect of the present teaching, there is provided an ink set including:

a water-based ink for ink-jet recording containing an anionic coloring agent and water; and the treatment agent of the first aspect.

DESCRIPTION OF THE EMBODIMENTS

<Treatment Agent>

Figure 1:
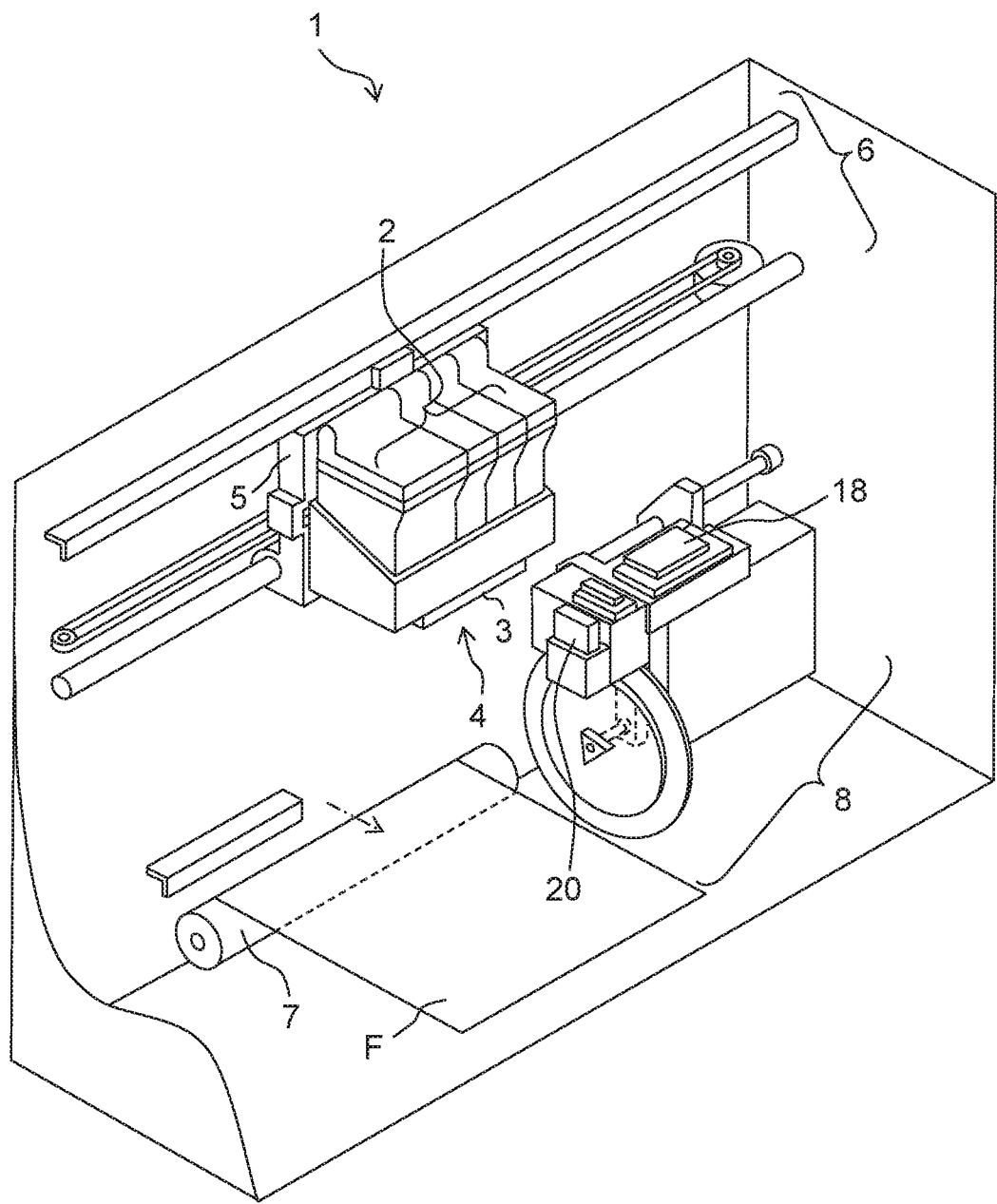
FIG. 1 is a schematic perspective view of an example of the configuration of an ink-jet recording apparatus of the present teaching.

A treatment agent of the present teaching will be explained. As described above, the treatment agent of the present teaching is a treatment agent applicable to a recording surface of a recording medium which is recording paper or fabric (a recording medium including recording paper and fabric). The treatment agent contains: a cationic substance; and a non-cationic sizing agent. The cationic substance is at least one cationic substance which is selected from the group consisting of: a cationic polymer capable of forming a flexible film in a case that the cationic polymer is dried, a cationic surfactant, a polyvalent metal salt and a polyvalent metal ion.

In a case that the recording medium is the fabric, a cationic polymer which is capable of forming a flexible film in a case that the cationic polymer is dried is used as the cationic polymer, for the purpose of suppressing any hardening of the fabric after having the treatment agent applied thereto. As will be described later on, in a case that the recording medium is the fabric, the printed matter may be washed with water and dried. The cationic polymer which is capable of forming the flexible film in a case that the cationic polymer is dried suppresses any hardening of the printed matter after washing and drying the printed matter. Namely, the hardness of the washed printed matter is capable of returning close to an original hardness of the recording medium (fabric). In a case that the recording medium is the fabric, it is preferred, for example, that the washed printed matter has a small difference in angle from a comparison sample in an evaluation of hardness of recording medium (which will be described later on); specifically, the difference in angle is preferably not more than 20 degrees and, is more preferably not more than 10 degrees. The cationic polymer is exemplified, for example, by a cationic polymer having an urethane structure, a water-soluble polymer having diallylamines represented by the formula (2) as a constituent of the water-soluble polymer, polyamine, polyallylamine, polyethyleneimine, polyvinylamine, polyvinylpyridine, polyethyleneimine-epichlorohydrin reaction product, polyamide-polyamine resin, polyamide-epichlorohydrin resin, polyamidine, cationic epoxy resin, polyacrylamide, polyacrylic acid ester, polymethacrylic acid ester, polyvinyl formamide, aminoacetalized polyvinyl alcohol, polyvinyl benzyl onium, dicyandiamide-formalin polycondensate, dicyandiamide-diethylenetriamine polycondensate, epichlorohydrin-dimethylamine addition polymer, dimethyldiallylammonium chloride-$SO_2$ copolymer, dimethyldiallylammonium chloride polycondensate, and derivatives thereof. Further, the cationic polymer described above is also exemplified, for example, by a polymer of single monomer or a copolymer of a plurality of monomers composed of at least one of water-soluble monomers including, for example, dimethylaminoethyl methacrylate (DM), methacryloyloxyethyl trimethyl ammonium chloride (DMC), methacryloyloxyethyl benzyl dimethyl-ammonium chloride (DMBC), dimethylaminoethyl acrylate (DA), acryloyloxyethyl trimethyl ammonium chloride (DMQ), acryloyloxyethyl acrylamide (DMAPAA), acrylamide propyl trimethyl ammonium chloride (DMAPAAQ), etc. Among these substances, the cationic polymer having the urethane structure, the water-soluble polymer having the diallylamines represented by the formula (2) as a constituent of the water-soluble polymer, the polyallylamine, and the polyethyleneimine are preferred. In a case that the cationic polymer composes an emulsion, the minimum film forming temperature of the cationic polymer is preferably not more than 25° C.

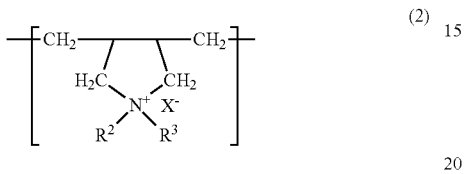

(2)

In the formula (2), $R^2$ and $R^3$ are each an alkyl group. The alkyl group is exemplified, for example, by a methyl group, an ethyl group, an isopropyl group, etc. The alkyl group may have a substituent group such as a halogen atom, and may be a straight-chain or branched-chain alkyl group.

In the formula (2), $X^-$ is an anion which is exemplified, for example, by methylsulfate ion, ethylsulfate ion, chloride ion, sulfate ion, acetate ion, phosphate ion, citrate ion, amidosulfuric acid ion, and the like.

In the water-soluble polymer, a number (n) of the constituent represented by the formula (2) is, for example, in a range of 5 to 1000, in a range of 10 to 500, or in a range of 20 to 200.

The weight average molecular weight of the water-soluble polymer represented by the formula (2) is, for example, in a range of 1,000 to 100,000, in a range of 2,000 to 50,000, or exceeds 5,000 and is less than 20,000. Under a condition that the weight average molecular weight of the water-soluble polymer represented by the formula (2) exceeds 5,000 and is less than 20,000, it is possible to obtain a treatment agent with which the change in color (color difference), between a case of performing recording on the recording paper (recording paper sheet) and a case of performing recording on the fabric is small, and with which, in the case of performing recording on to the fabric, the color loss (discoloring) before and after washing (cleaning) the fabric by water is further suppressed.

The water-soluble polymer represented by the formula (2) may be privately prepared in-house, or any commercially available product may be used as the water-soluble polymer represented by the formula (2). The commercially available product is exemplified, for example, by: "UNISENCE FPA (trade name) 100LU" and "UNISENSE FPA (trade name) 101LU" manufactured by SENKA CORPORATION; "PAS-84" and "PAS-2451" manufactured by NITTOBO MEDICAL CO., LTD.; etc. The specific of the commercial available products is as follows.

UNISENCE FPA (trade name) 100LU is a water-soluble polymer having diallylamines represented by the formula (2) as a constituent thereof, wherein $R^2$ and $R^3$ are each a methyl group, $X^-$ is a methylsulfate ion, and the weight-average molecular weight exceeds (is more than) 5,000 and is less than 20,000.

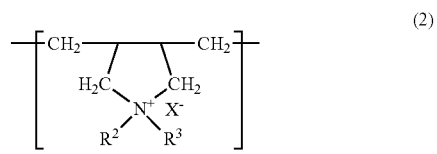

(2)

UNISENCE FPA (trade name) 101LU is a water-soluble polymer having diallylamines represented by the formula (2) as a constituent thereof, wherein $R^2$ and $R^3$ are each a methyl group, $X^-$ is a methylsulfate ion, and the weight-average molecular weight is in a range of 20,0000 to 100,000.

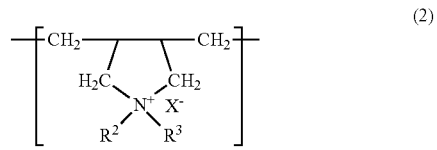

(2)

PAS-84 is a water-soluble polymer having diallylamines represented by the formula (2) and units represented by formulae (4) and (5) as constituents of the water-soluble polymer, wherein $R^2$ and $R^3$ are each a methyl group, $X^-$ is a chloride ion, and the weight-average molecular weight is 20,000. In the water-soluble polymer, a number (o) of the constituent represented by the formula (4) and a number (p) of the constituent represented by the formula (5) may each be the same as the number (n) of the constituent represented by the formula (2).

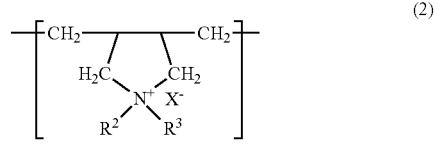

(2)

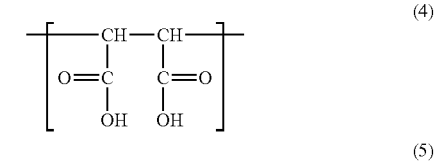

(4)

(5)

PAS-2451 is a water-soluble polymer having diallylamines represented by the formula (2) and a unit represented by formula (4) as constituents of the water-soluble polymer, wherein $R^2$ is a methyl group, $R^3$ is an ethyl group, $X^-$ is an ethylsulfate ion, and the weight-average molecular weight is 30,000. The number (o) of the constituent represented by the formula (4) may be the same as the number (n) of the constituent represented by the formula (2).

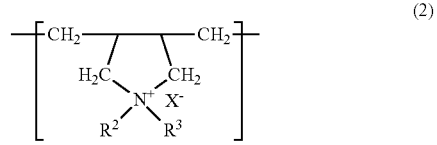

(2)

-continued

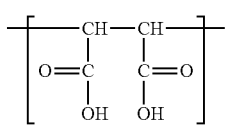

(4)

The cationic surfactant described above is exemplified, for example, by quaternary ammonium salt, quaternary ammonium ion, primary, secondary, and tertiary amine salt type compounds, alkylamine salt, dialkylamine salt, aliphatic amine salt, alkylpyridinium salt, imidazolinium salt, sulfonium salt, phosphonium salt, onium salt, etc. Specific examples of the cationic surfactant other than the quaternary ammonium salt and the quaternary ammonium ion are exemplified, for example, by hydrochlorides and acetates of laurylamine, palm amine, rosin amine and the like, cetylpyridinium chloride, cetylpyridinium bromide, dihydroxyethyllaurylamine, etc. Among them, quaternary ammonium salt and quaternary ammonium ion are preferred.

The quaternary ammonium salt is exemplified, for example, by a cationic compound represented by the formula (A).

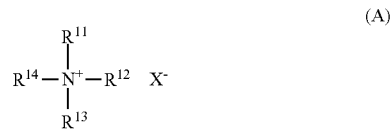

(A)

In the formula (A), each of $R^{11}$ to $R^{14}$ is a hydrocarbon group having 1 to 20 carbon atoms; $R^{11}$ to $R^{14}$ may be identical with each other or different from each other; and $X^-$ is an anion.

In the formula (A), each of $R^{11}$ to $R^{13}$ may be an alkyl group having 1 to 5 carbon atoms. The alkyl group having 1 to 5 carbon atoms may have a straight chain or a branched chain, and is exemplified, for example, by methyl group, ethyl group, n-propyl group, isopropyl group, n-butyl group, sec-butyl group, isobutyl group, tert-butyl group, n-pentyl group, isopentyl group, sec-pentyl group, 3-pentyl group, tert-pentyl group, etc. The alkyl group having 1 to 5 carbon atoms may have a substituent group such as halogen atom or the like. In the formula (A), $R^{11}$ to $R^{13}$ may be identical with each other or different from each other.

In the formula (A), $R^{14}$ may be an alkyl group having 6 to 30 carbon atoms. The alkyl group having 6 to 30 carbon atoms is exemplified, for example, by hexyl group, heptyl group, octyl group, nonyl group, decyl group, lauryl group (dodecyl group), tetradecyl group, cetyl group (hexadecyl group), etc. The alkyl group having 6 to 30 carbon atoms may have a substituent group such as halogen atom or the like, and may have either a straight chain or a branched chain.

In the formula (A), $X^-$ is an anion. Although the anion may be any anion, the anion may be exemplified, for example, by methylsulfate ion, ethylsulfate ion, sulfate ion, nitrate ion, acetate ion, dicarboxylate (for example, malate, itaconate and the like) ion, tricarboxylate (for example, citrate and the like) ion, hydroxide ion, halide ion, etc. In a case that $X^-$ is dicarboxylate ion or tricarboxylate ion, dicarboxylate ion or tricarboxylate ion is the counter ion for two or three quaternary ammonium ions (cations obtained by removing $X^-$ from the formula (A)).

The cationic compound represented by the formula (A) is exemplified, for example, by lauryltrimethylammonium sulfate, lauryltrimethylammonium chloride, cetyltrimethylammonium chloride, benzyldimethylalkylammonium chloride, etc. The cationic compound represented by the formula (A) may be privately prepared in-house, or any commercially available product may be used as the cationic compound represented by the formula (A). The commercially available product is exemplified, for example, by "Catiogen (trade name) TML", "Catiogen (trade name) TMP", and "Catiogen (trade name) ES-O" produced by DKS CO., LTD. (DAI-ICHI KOGYO SEIYAKU CO., LTD), and "Benzalkonium chloride" produced by TOKYO KASEI KOGYO CO., LTD.

The quaternary ammonium ion is exemplified, for example, by a cation obtained by removing $X^-$ from the formula (A).

The polyvalent metal salt is exemplified, for example, by aluminum chloride, aluminum bromide, aluminum sulfate, aluminum nitrate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogenphosphate, calcium thiocyanate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, manganese sulfate, manganese nitrate, manganese dihydrogenphosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc nitrate, zinc thiocyanate, zinc acetate, etc. Among these substances, polyvalent metal salts of calcium and magnesium are preferred. Further, divalent metal salts are preferred in view of the degree of coagulation of an anionic colorant (coloring agent) contained in the water-based ink, as will be described later on.

The polyvalent metal ion is exemplified, for example, by aluminum ion, barium ion, calcium ion, copper ion, iron ion, magnesium ion, manganese ion, nickel ion, stannum ion, titanium ion, zinc ion, etc. Among these polyvalent metal ions, calcium ion and magnesium ion are preferred. Further, divalent metal ion is preferred in view of the degree of coagulation of the anionic colorant contained in the water-based ink which is to be described later on.

As the cationic substance, the cationic polymer having the urethane structure is particularly preferred among those as described above. The cationic polymer having the urethane structure may have, for example, a cationic unit including, for example, organic amine and the like, together with the urethane structure described above. The cationic polymer having the urethane structure may be privately prepared in-house, or any commercially available product may be used as the cationic polymer having the urethane structure.

It is preferred that a ratio of the urethane structure (a ratio of occupation of the urethane structure) is not less than 10%, more preferably not less than 20% in the cationic polymer having the urethane structure. Further, note that in the cationic polymer having the urethane structure, the ratio of the urethane structure is preferably not more than 60% by weight. By allowing the ratio of the urethane structure to be within the above-described range, it is possible to realize both forming the flexible film of the cationic polymer and high storing stability of the water-based ink. Note that in a case that the cationic polymer having the urethane structure is an emulsion (which is to be described later on), the phrase that the "ratio of the urethane structure in the cationic polymer having the urethane structure" means a ratio of the urethane structure in a solid content of the emulsion.

The cationic polymer having the urethane structure may be, for example, an emulsion (urethane emulsion). Namely, the treatment agent may contain an emulsion of the cationic polymer having the urethane structure (urethane emulsion).

The cationic polymer having the urethane structure preferably has at least one of an acrylic structure and a styrene structure in a part, of the cationic polymer having the urethane structure, which is different from the urethane structure. The cationic polymer having the urethane structure more preferably has the acrylic structure.

The cationic polymer having the urethane structure is, for example, an emulsion, and preferably has at least one of the acrylic structure and the styrene structure in a part, of the cationic polymer having the urethane structure, which is different from the urethane structure, and more preferably has the acrylic structure (is more preferably a urethane acrylic emulsion). A commercially available product of the urethane acrylic emulsion is exemplified, for example, by "MOWINYL (trade name) 6910" manufactured by JAPAN COATING RESIN CO., LTD.; "SUPERFLEX (trade name) 620", "SUPERFLEX (trade name) 650" manufactured by DKS CO., LTD (DAI-ICHI KOGYO SEIYAKU CO., LTD); and the like.

The weight-average molecular weight of the cationic polymer having the urethane structure is, for example, in a range of 1,000 to 500,000, or in a range of 3,000 to 500,000. Note that in a case that the cationic polymer having the urethane structure is the emulsion, the term "weight-average molecular weight" means a weight-average molecular weight of a solid content of the emulsion.

In the cationic polymer having the urethane structure, the urethane structure is preferably obtained from: an aliphatic isocyanate; and a polyether polyol or polyester polyol. For example, in a case that an isocyanate group of the urethane structure is an aliphatic isocyanate, it is possible to further suppress any yellowing of the recording medium than in a case that the isocyanate group of the urethane structure is an aromatic isocyanate. Further, for example, in a case that a hydroxyl group of the urethane structure is a polyether polyol or polyester polyol, it is possible to further suppress any hardening of the recording medium than in a case that the hydroxyl group of the urethane structure is a polycarbonate polyol.

One kind of the cationic substance as described above may be used singly, or two or more kinds of the cationic substance as described above may be used in combination. The blending amount of the cationic substance in the entire amount of the treatment agent is, for example, in a range of 0.5% by weight to 20% by weight, in a range of 1% by weight to 20% by weight, in a range of 1% by weight to 15% by weight, or in a range of 10% by weight to 15% by weight. By allowing the blending amount of the cationic substance to be within the above-described range, it is possible to further improve the water resistance of a printed matter.

The non-cationic sizing agent is not particularly limited, and is exemplified, for example, by sodium alginate, pregelatinized starch, carboxymethyl cellulose (CMC), polyvinyl alcohol, sodium acrylate, guar gum, etc. The non-cationic sizing agent may be used singly, or two or more kinds of the non-cationic sizing agent may be used in combination. The non-cationic sizing agent may be an anionic sizing agent and/or a nonionic sizing agent.

The blending amount of the non-cationic sizing agent in the entire amount of the treatment agent is, for example, in a range of 0.1% by weight to 20% by weight, in a range of 0.2% by weight to 15% by weight, in a range of 0.2% by weight to 10% by weight or in a range of 1% by weight to 5% by weight. By allowing the blending amount of the non-cationic sizing agent to be within the above-described range, it is possible to further improve the transportability of the recording medium during the printing and to have the hardness of the printed matter return close to the original hardness of the recording medium (fabric) by washing the printed matter with water after the printing.

The treatment agent of the present teaching contains the cationic substance and the non-cationic sizing agent and thus is capable of improving the transportability of the recording medium during printing and improving the water resistance of the printed matter. Further, when the recording medium is the fabric, the treatment agent of the present teaching is capable of having the hardness of the printed matter return close to the original hardness of the recording medium (fabric) by washing the printed matter with water after the printing. Since a colorant contained in the water-based ink is generally anionic, the charge of the colorant is canceled by the cationic substance contained in the treatment agent, which in turn causes the colorant to coagulate or increases the viscosity of the colorant. With this, it is presumed that the water resistance of the printed matter is improved and that the optical density (OD value) is also improved. Further, it is presumed that the non-cationic sizing agent contained in the treatment agent suppresses any warping (distortion) of the recording medium and thus to improve the transportability (conveyance property) of the recording medium. Furthermore, when the recording medium is the fabric, the non-cationic sizing agent is removed from the recording medium (fabric) by washing the printed matter with water after the printing. With this, feel, such as hand touch, of the printed matter is capable of returning close to original feel of the recording medium (fabric) which has not been applied with the treatment agent and not been printed.

In the treatment agent, a ratio (X/Y) of the blending amount (X: % by weight) of the cationic substance to the blending amount (Y: % by weigh) of the non-cationic sizing agent is preferably, for example, in a range of 0.3 to 50, or in a range of 3.3 to 5. By allowing the ratio (X/Y) to be within this range, it is possible to achieve a good balance between the improvement in the transportability of the recording medium during printing and the improvement in the water resistance of the printed matter.

The treatment agent may further contain water. The water contained in the treatment agent is preferably ion-exchange water or purified water (pure water). The blending amount of the water in the entire amount of the treatment agent may be, for example, a balance of the other components.

The treatment agent may further contain a water-soluble organic solvent. The water-soluble organic solvent contained in the treatment agent is not particularly limited, and is exemplified, for example, by: lower alcohols such as methyl alcohol, ethyl alcohol, n-propyl alcohol, isopropyl alcohol, n-butyl alcohol, sec-butyl alcohol, tert-butyl alcohol, etc.; amides such as dimethylformamide, dimethylacetamide, etc.; ketones such as acetone, etc.; ketoalcohols (ketone alcohols) such as diacetone alcohol, etc.; ethers such as tetrahydrofuran, dioxane, etc.; polyethers such as polyalkylene glycol, etc.; polyvalent alcohols such as alkylene glycol, glycerol, trimethylolpropane, trimethylolethane, etc.; 2-pyrrolidone; N-methyl-2-pyrrolidone; 1,3-dimethyl-2-imidazolidinone; glycol ethers such as ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that one kind of the water-soluble organic solvent as described above is used singly, or two or more kinds of the water-soluble organic solvent are used in combination.

The blending amount of the water-soluble organic solvent in the entire amount of the treatment agent is, for example, in a range of 0% by weight to 95% by weight, in a range of 5% by weight to 85% by weight, or in a range of 5% by weight to 60% by weight.

It is preferred that the treatment agent does not substantially contain any colorant such as a dye and a pigment, etc., so as not to influence the color (hue) of the printed matter. The blending amount of the colorant in the entire amount of the treatment agent is, for example, in a range of 0% by weight to 1% by weight, or in a range of 0% by weight to 0.1% by weight.

The treatment agent may further contain a conventionally known additive, as necessary. The additive is exemplified, for example, by surfactants, pH-adjusting agents, viscosity-adjusting agents, surface tension-adjusting agents, fungicides, etc. The viscosity-adjusting agents are exemplified, for example, by cellulose, water-soluble resin, etc. Further, the treatment agent may be, for example, in a liquid form (treatment liquid) or in a gel form. In a case that the treatment agent is in the liquid (treatment liquid) or in the gel form, the treatment agent can be easily applied to (coated on) the recording medium.

The treatment agent can be prepared, for example, by uniformly mixing the cationic substance and the non-cationic sizing agent, and an optionally other additive(s) as necessary, by a conventionally known method.

As will be described later on, in a case that the recording medium is the recording paper (recording paper sheet), it is preferred that an application amount of the treatment agent of the present teaching per unit area of a recording surface of the recording medium is not more than 1.3 mg/cm$^2$ (8.4 mg/inch$^2$); and in a case that the recording medium is the fabric, it is preferred that the application amount of the treatment agent per the unit area of the recording surface is in a range of 5.0 mg/cm$^2$ (32 mg/inch$^2$) to 48 mg/cm$^2$ (310 mg/inch$^2$). With this, it is possible to further improve the transportability of the recording medium during recording and the water resistance of the printed matter. Further, in a case that the recording medium is the recording paper, the application amount of the treatment agent per the unit area of the recording surface is preferably not more than 0.6 mg/cm$^2$, is more preferably in a range of 0.3 mg/cm$^2$ to 0.6 mg/cm$^2$. With this, it is possible to suppress any curling of the recording paper as well as to improve the optical density (OD value) of the printed matter. Furthermore, in a case that the recording medium is the fabric, the application amount of the treatment agent per the unit area of the recording surface is further more preferably in a range of 10 mg/cm$^2$ to 36 mg/cm$^2$. With this, it is possible to further improve the transportability of the fabric during recording, as well as to have the hardness of the printed matter return close to the original hardness of the recording medium (fabric) by washing the printed matter with water after the printing.

As will be described later on, in the treatment agent of the present teaching, for example, in a case that the recording medium is the fabric, the non-cationic sizing agent applied to the recording surface may be washed by water.

As explained above, the treatment agent of the present teaching contains the cationic substance and the non-cationic sizing agent, and thus is capable of improving the transportability of the recording medium during printing and improving the water resistance of the printed matter. Further, when the recording medium is the fabric, by washing the printed matter, the printed matter does not impair the original feel of the recording medium (fabric).

<Ink Set>

Next, an ink set of the present teaching will be explained. The ink set of the present teaching includes a water-based ink for ink-jet recording (hereinafter referred to as "water-based ink" or "ink" in some cases) and a treatment agent. The water-based ink contains an anionic colorant and water and the treatment agent is the treatment agent of the present teaching. The ink set is usable for performing recording both on recording paper (recording paper sheet, recording sheet) and fabric (cloth).

<Water-Based Ink>

The water-based ink contains the anionic colorant and the water.

The anionic colorant may be either one of a pigment and a dye. Further, it is allowable to use the pigment and the dye in combination as the anionic colorant.

The pigment, which is usable as the anionic colorant described above, is not specifically limited; the pigment is exemplified, for example, by carbon black, an inorganic pigment, an organic pigment, etc. The carbon black is exemplified, for example, by furnace black, lamp black, acetylene black, channel black, etc. The inorganic pigment is exemplified, for example, by titanium oxide, inorganic pigments based on iron oxide, inorganic pigments based on carbon black, etc. The organic pigment is exemplified, for example, by azo-pigments such as azo lake, insoluble azo-pigment, condensed azo-pigment, chelate azo-pigment, etc.; polycyclic pigments such as phthalocyanine pigment, perylene and perynon pigments, anthraquinone pigment, quinacridone pigment, dioxadine pigment, thioindigo pigment, isoindolinone pigment, quinophthalone pigment etc.; lake pigments such as basic dye type lake pigment, acid dye type lake pigment, etc.; nitro pigments; nitroso pigments; aniline black daylight fluorescent pigment; and the like. Any other pigment can be also used provided that the pigment is dispersible in the water phase. Specific examples of such pigments are also exemplified, for example, by C. I. Pigment Blacks 1, 6, and 7; C. I. Pigment Yellows 1, 2, 3, 12, 13, 14, 15, 16, 17, 55, 73, 74, 75, 78, 83, 93, 94, 95, 97, 98, 114, 128, 129, 138, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 221, 222, 224, and 238; C. I. Pigment Violet 19, and 196; C. I. Pigment Blues 1, 2, 3, 15, 15:1, 15:2, 15:3, 15:4, 16, 22, and 60; C. I. Pigment Greens 7 and 36; as well as solid solutions thereof; and the like. One kind of the pigment as described above may be used singly, or two or more kinds of the pigment as described above may be used in combination.

The pigment, which is usable as the anionic colorant described above, is also exemplified by self-dispersible pigments. The self-dispersible pigment is dispersible in water without using any dispersing agent, for example, owing to the fact that at least one of the hydrophilic functional group and the salt thereof including, for example, a carbonyl group, a hydroxyl group, a carboxylic acid group, a sulfonic acid group, and a phosphoric acid group is introduced into the particles of the pigment by the chemical bond directly or with any group intervening therebetween. As the self-dispersible pigment, it is possible to use a self-dispersible pigment in which the pigment is subjected to a treatment by any one of methods described, for example, in Japanese Patent Application Laid-open No. 8-3498 corresponding to U.S. Pat. No. 5,609,671, Published Japanese Translation of PCT International Publication for Patent Application No. 2000-513396 corresponding to U.S. Pat. No. 5,837,045, Published Japanese Translation of PCT International Publication for Patent Application No. 2008-524400 corresponding to United States Patent Application Publication No. 2006/0201380, Published Japanese Translation of PCT International Publication for Patent Application No. 2009-515007 corresponding to United States Patent Application Publication Nos. 2007/0100024 and 2007/0100023, Published Japanese Translation of PCT International Publication for Patent Application No. 2011-515535 corresponding to United States Patent Application Publication No. 2009/0229489, etc. It is possible to use, as a material for the self-dispersible pigment, any one of the inorganic pigment and the organic pigment. Further, the pigment which is suitable to perform the treatment as described above is exemplified by carbon blacks including, for example, "MA8", "MA100" and "#2650" produced by MITSUBISHI CHEMICAL CORPORATION, and "Carbon Black FW200" produced by DEGUSSA, etc. As the self-dispersible pigment, it is also allowable to use, for example, any commercially available product. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M", and "CAB-O-JET (trade name) 470Y" produced by CABOT CORPORATION; "BONJET (trade name) BLACK CW-2" and "BONJET (trade name) BLACK CW-3" produced by ORIENT CHEMICAL INDUSTRIES, LTD.; and "LIOJET (trade name) WD BLACK 002C" produced by TOYO INK MFG. CO., LTD.; and the like.

The dye, which is usable as the anionic colorant described above, is not specifically limited. The dye is exemplified, for example, by direct dyes, acid dyes, reactive dyes, food dyes, etc.

The direct dye is not specifically limited, and is exemplified, for example, by C. I. Direct Black, C. I. Direct Blue, C. I. Direct Red, C. I. Direct Yellow, C. I. Direct Orange, C. I. Direct Violet, C. I. Direct Brown, C. I. Direct Green, etc. C. I. Direct Black described above is exemplified, for example, by C. I. Direct Blacks 17, 19, 22, 31, 32, 51, 62, 71, 74, 108, 112, 113, 146, 154, 168, 195, etc. C. I. Direct Blue described above is exemplified, for example, by C. I. Direct Blues 1, 6, 15, 22, 25, 41, 71, 76, 77, 80, 86, 90, 98, 106, 108, 120, 158, 163, 168, 199, 226, etc. C. I. Direct Red described above is exemplified, for example, by C. I. Direct Reds 1, 2, 4, 9, 11, 17, 20, 23, 24, 28, 31, 39, 46, 62, 75, 79, 80, 83, 89, 95, 197, 201, 218, 220, 224, 225, 226, 227, 228, 229, 230, etc. C. I. Direct Yellow described above is exemplified, for example, by C. I. Direct Yellows 8, 11, 12, 24, 26, 27, 28, 33, 39, 44, 50, 58, 85, 86, 87, 88, 89, 98, 100, 110, 132, 142, 173, etc. C. I. Direct Orange described above is exemplified, for example, by C. I. Direct Oranges 34, 39, 44, 46, 60, etc. C. I. Direct Violet described above is exemplified, for example, by C. I. Direct Violets 47, 48, etc. C. I. Direct Brown described above is exemplified, for example, by C. I. Direct Brown 109, etc. C. I. Direct Green described above is exemplified, for example, by C. I. Direct Green 59, etc.

The acid dye is not specifically limited, and is exemplified, for example, by C. I. Acid Black, C. I. Acid Blue, C. I. Acid Red, C. I. Acid Yellow, C. I. Acid Orange, C. I. Acid Violet, etc. C. I. Acid Black described above is exemplified, for example, by C. I. Acid Blacks 2, 7, 24, 26, 31, 48, 51, 52, 63, 110, 112, 115, 118, 156, etc. C. I. Acid Blue described above is exemplified, for example, by C. I. Acid Blues 1, 7, 9, 15, 22, 23, 25, 29, 40, 43, 59, 62, 74, 78, 80, 90, 93, 100, 102, 104, 117, 120, 127, 138, 158, 161, 167, 220, 234, etc. C. I. Acid Red described above is exemplified, for example, by C. I. Acid Reds 1, 6, 8, 9, 13, 14, 18, 26, 27, 32, 35, 37, 42, 51, 52, 80, 83, 85, 87, 89, 92, 94, 106, 114, 115, 133, 134, 145, 158, 180, 198, 249, 256, 265, 289, 315, 317, etc. C. I. Acid Yellow described above is exemplified, for example, by C. I. Acid Yellows 1, 3, 7, 11, 17, 23, 25, 29, 36, 38, 40, 42, 44, 61, 71, 76, 98, 99, etc. C. I. Acid Orange described above is exemplified, for example, by C. I. Acid Oranges 7, 19, etc. C. I. Acid Violet described above is exemplified, for example, by C. I. Acid Violet 49, etc.

The reactive dye is not specifically limited, and is exemplified, for example, by C. I. Reactive Blue, C. I. Reactive Red, C. I. Reactive Yellow, etc. C. I. Reactive Blue described above is exemplified, for example, by C. I. Reactive Blues 4, 5, 7, 13, 14, 15, 18, 19, 21, 26, 27, 29, 32, 38, 40, 44, 100, etc. C. I. Reactive Red described above is exemplified, for example, by C. I. Reactive Reds 7, 12, 13, 15, 17, 20, 23, 24, 31, 42, 45, 46, 59, etc. C. I. Reactive Yellow described above is exemplified, for example, by C. I. Reactive Yellows 2, 3, 17, 25, 37, 42, etc.

The food dye is not specifically limited, and is exemplified, for example, by C. I. Food Black, C. I. Food Red, C. I. Food Yellow, etc. C. I. Food Black described above is exemplified, for example, by C. I. Food Blacks 1, 2, etc. C. I. Food Red described above is exemplified, for example, by C. I. Food Reds 87, 92, 94, etc. C. I. Food Yellow described above is exemplified, for example, by C. I. Food Yellow 3, etc.

The blending amount of the anionic colorant in the entire amount of the water-based ink is, for example, in a range of 0.1% by weight to 20% by weight, in a range of 1% by weight to 15% by weight, or in a range of 2% by weight to 10% by weight. Note that in a case that the anionic colorant is the pigment, the blending amount of the anionic colorant is, for example, the pigment solid content amount.

The water contained in the water-based ink is preferably ion-exchange water or purified water (pure water). The blending amount of the water in the entire amount of the water-based ink may be, for example, a balance of the other components.

The water-based ink may further contain a water-soluble organic solvent. The water-soluble organic solvent contained in the water-based ink is exemplified, for example, by a humectant which prevents the water-based ink from drying at an end of a nozzle in an ink-jet head, a penetrant which adjusts the drying velocity on a recording medium, etc.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, tert-butyl alcohol, etc.; amides such as dimethylformamide, dimethylacetamide, etc.; ketones such as acetone, etc.; ketoalcohols (ketone alcohols) such as diacetone alcohol, etc.; ethers such as tetrahydrofuran, dioxane, etc.; polyethers such as polyalkylene glycol, etc.; polyvalent alcohols such as alkylene glycol, glycerol, trimethylolpropane, trimethylolethane, etc.; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that one kind of the humectant as described above is used singly, or two or more kinds of the humectant are used in combination. Among the above-described humectants, the humectant is preferably a polyvalent alcohol such as alkylene glycol, glycerol, etc.

The blending amount of the humectant in the entire amount of the water-based ink is, for example, in a range of 0% by weight to 95% by weight, in a range of 5% by weight to 80% by weight, or in a range of 5% by weight to 50% by weight.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One kind of the penetrant may be used singly, or two or more kinds of the penetrant may be used in combination.

The blending amount of the penetrant in the entire amount of the water-based ink is, for example, in a range of 0% by weight to 20% by weight, in a range of 0% by weight to 15% by weight, or in a range of 1% by weight to 4% by weight.

The water-based ink may further contain a conventionally known additive, as necessary.

The water-based ink can be prepared, for example, by uniformly mixing the anionic colorant and water, and an optionally other additive(s) as necessary, by a conventionally known method, and then removing any non-dissolved matter, with a filter, etc.

The treatment agent in the ink set of the present teaching is the same as or equivalent to the above-described treatment agent of the present teaching. The explanation for the treatment agent of the present teaching described above can be incorporated herein.

In the ink set of the present teaching, a ratio (X/Z) of the blending amount (X: % by weight) of the cationic substance in the entire amount of the treatment agent to the blending amount (Z: % by weigh) of the anionic colorant in the entire amount of the water-based ink is preferably, for example, in a range of 0.25 to 3.8 or in a range of 2.5 to 3.8. In a case that the above-described ratio (X/Z) is within this range, it is presumed that the cationic substance and the anionic colorant interact with each other more efficiently, thereby further improving the water resistance of the printed matter.

It is preferred that in the ink set of the present teaching, the water-based ink and the treatment agent both contain the same penetrant and/or humectant. By containing the same penetrant and/or humectant, it is presumed that the water-based ink and the treatment agent making contact with each other on the recording medium match with each other satisfactorily, thereby further improving the water resistance of the printed matter. The penetrant is not particularly limited; it is allowable to use, as the penetrant, for example the penetrants described above. However, among these penetrants, triethylene glycol-n-butyl ether is preferred. The humectant is not particularly limited; it is allowable to use, as the humectant, for example the humectants described above. However, among these humectants, glycerol is preferred.

<Image Forming Method and Ink-Jet Recording Apparatus>

Next, an image forming method and an ink-jet recording apparatus of the present teaching will be explained.

The image forming method of the present teaching is an image forming method for using the ink set of the present teaching so as to form an image on a recording surface of a recording medium which is recording paper or fabric, the image forming method including: a treatment agent applying step of applying the treatment agent to the recording surface of the recording medium; and an image printing step of performing printing of the image on the recording surface, of the recording medium, having the treatment agent applied thereto by jetting the water-based ink onto the recording surface of the recording medium by means of an ink-jet system.

The ink set in the image forming method of the present teaching is the same as or equivalent to the ink set of the present teaching as described above, and the explanation for the ink set of the present teaching can be incorporated herein.

The ink-jet recording apparatus of the present teaching is an ink-jet recording apparatus including: an ink set accommodating section; a treatment agent applying mechanism; and an ink jetting mechanism. The ink set of the present teaching is accommodated in the ink set accommodating section; the treatment agent constructing the ink set is applied to a recording surface of the recording medium by the treatment agent applying mechanism; and the water-based ink constructing the ink set is jetted onto the recording surface of the recording medium by the ink jetting mechanism.

FIG. 1 depicts an example of the configuration of an ink-jet recording apparatus of the present teaching. As depicted in FIG. 1, an ink-jet recording apparatus 1 includes four ink cartridges (ink containers) 2, an ink jetting mechanism (ink-jet head) 3, a head unit 4, a carriage 5, a driving unit 6, a platen roller 7 and a purge device 8 as main constitutive components or parts of the ink-jet recording apparatus 1. Although not depicted in FIG. 1, the ink-jet recording apparatus 1 includes the treatment agent applying mechanism at an appropriate position or location therein. Further, although not depicted in FIG. 1, the ink-jet recording apparatus 1 may include a control mechanism (controller) and a drying mechanism (which will be described later on) each at an appropriate location or position.

Each of the four ink cartridges (ink containers) 2 contains one of four water-based inks of yellow, magenta, cyan, and black. For example, at least one of the four water-based inks is the water-based ink constructing the ink set of the present teaching. In this example, a set with the four ink cartridges 2 is indicated. However, instead of this set, the present teaching may use an integrated type ink cartridge of which interior is comparted (partitioned) to form a water-based yellow ink accommodating section, a water-based magenta ink accommodating section, a water-based cyan ink accommodating section, and a water-based black ink accommodating section. As a body of the ink cartridge, for example, any conventionally known main body of an ink cartridge may be used.

The ink-jet head 3 disposed on the head unit 4 performs recording (image printing) on a recording medium (for example, fabric F). Note that the recording medium may be a recording medium other than the fabric F, such as recording paper (recording paper sheet, recording sheet), etc. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821 corresponding to United States Patent Application Publication No. US2008/0241398 A1). The platen roller 7 extends in the reciprocating direction of the carriage 5 and is arranged to face the ink-jet head 3.

The purge device 8 sucks or draws unsatisfactory ink (poor ink) which contains air bubbles, etc., accumulated or trapped in the inside of the ink-jet head 3. As the purge device 8, it is possible to use, for example, a conventionally known purge device (for example, see Japanese Patent Application laid-open No. 2008-246821 corresponding to United States Patent Application Publication No. US2008/0241398 A1).

A wiper member 20 is provided on the purge device 8 at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 1, a cap 18 is provided to cover nozzles of the ink-jet head 3 which is returned to a reset position upon completion of recording, so as to prevent the water-based inks from drying.

In the ink-jet recording apparatus 1 of the present embodiment, the four ink cartridges (ink containers) 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, the four ink cartridges 2 are connected to the head unit 4 provided on the carriage 5 with tubes, etc., and the water-based inks are supplied from the four ink cartridges 2, respectively, to the head unit 4. Further, in these aspects, it is allowable to use four ink bottles having a bottle shape as the ink containers, instead of using the four ink cartridges 2. In such a case, each of the ink bottles is preferably provided with an inlet port via which the ink is poured from the outside to the inside of each of the ink bottles.

Image formation (forming of an image) using the ink-jet recording apparatus 1 is carried out, for example, as follows.

Figure 3A:
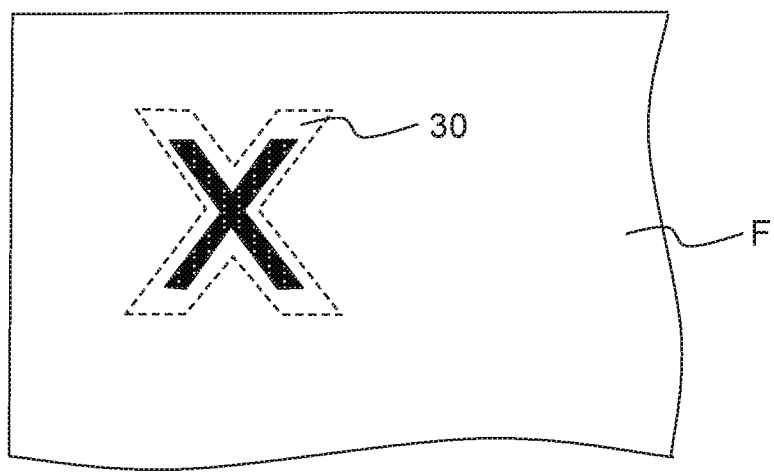
FIGS. 3A and 3B are each a view depicting an example of application of a treatment agent in an image forming method of the present teaching.
Figure 3B:
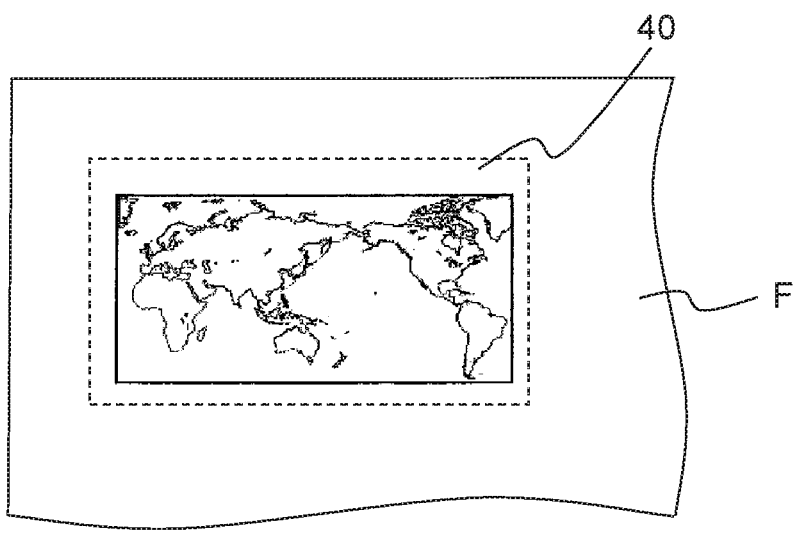

At first, the treatment agent is applied to a recording surface (image forming surface) of the recording medium with the treatment agent applying mechanism. In this situation, in a case that the recording medium is the recording paper, it is preferred that a controller provided on the ink-jet recording apparatus 1 makes an application amount ($T_P$) of the treatment agent per unit area of the recording surface to be not more than 1.3 mg/cm$^2$; and in a case that the recording medium is the fabric, it is preferred that the controller makes the application amount of the treatment agent per unit area ($T_F$) of the recording surface to be in a range of 5.0 mg/cm$^2$ to 48 mg/cm$^2$. In the present teaching, the application of the treatment agent can be carried out, for example, by means of a spray system, stamp application, brush application, roller application, dipping (immersion in the treatment agent), the ink-jet system, etc. The treatment agent may be applied to the entirety (entire surface) or a part of the recording surface of the recording medium. In a case that the treatment agent is applied to the part of the recording surface, at least an image printing portion, of the recording surface of the recording medium, in which recording is (to be) performed by using the water-based ink is an application portion for the treatment agent. In a case that the treatment agent is applied to the part of the recording surface, the size of the application portion is preferably larger than the image printing portion. For example, as depicted in FIG. 3A, in a case that an image of a letter "X" is recorded on a recording medium F, the treatment agent is preferably applied so that an application portion 30 has a line width which is larger than a line width of the letter. Further, as depicted in FIG. 3B, in a case that a pattern is recorded on the recording medium F, the treatment agent is preferably applied so that an application portion 40 is larger than the pattern.

In a case that the recording medium is the fabric in the image forming method of the present teaching, the image forming method may further include a drying step of drying the treatment agent applied in the treatment agent applying step. The drying step may be performed before an image printing step (to be described later on) or after the image printing step. Note that in the image forming method of the present teaching, the performance of the drying step is arbitrary; even in a case that the recording medium is the fabric, it is allowable that the drying step is not performed (that the drying step may be omitted).

The drying may be, for example, air drying (natural drying). Alternatively, the drying may be performed by using any commercially available drying mechanism such as an iron, a hot press machine, a dryer, an oven, a belt conveyer oven, etc. The drying temperature is, for example, in a range of 130° C. to 220° C., and the drying time is, for example, in a range of 30 seconds to 120 seconds. The drying temperature may be, for example, either a temperature of the drying atmosphere or a setting temperature of the drying mechanism.

Figure 2:
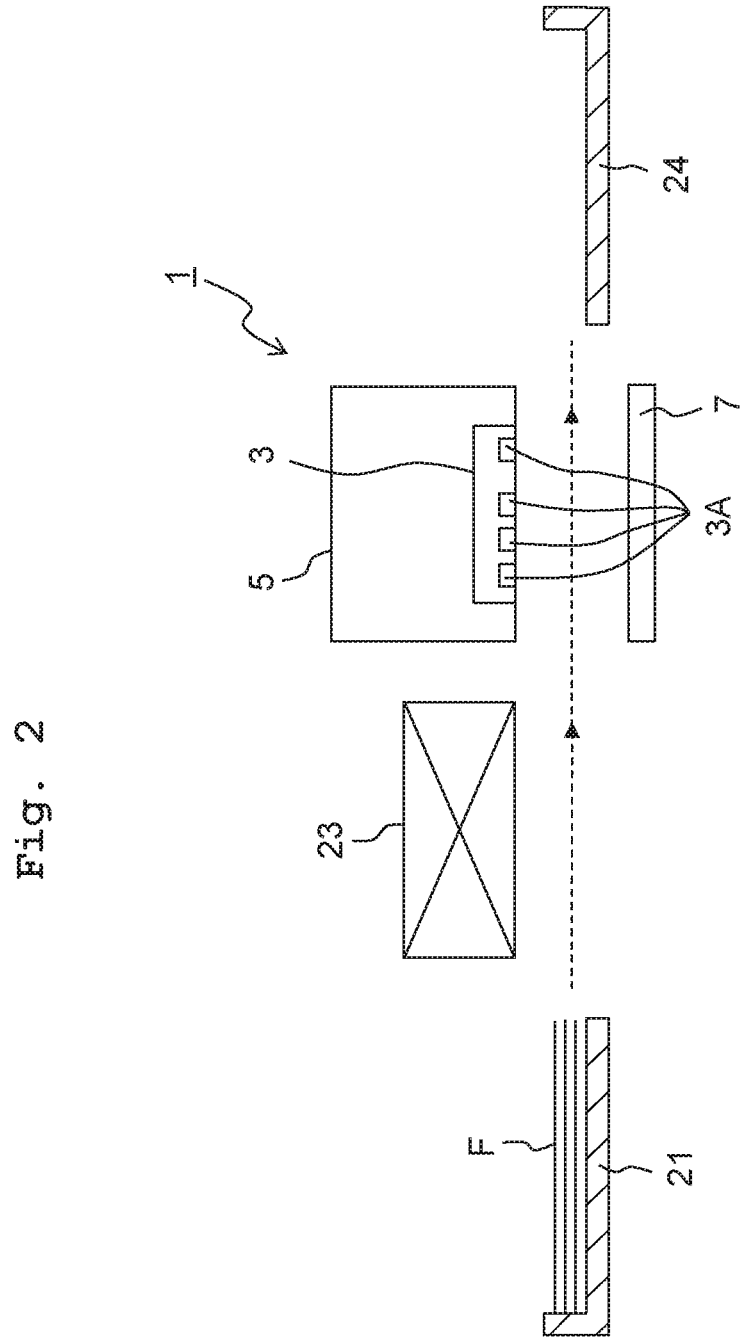
FIG. 2 is a schematic view of an example of the configuration of the ink-jet recording apparatus of the present teaching.

As depicted in FIG. 2, the drying step may be performed by using a drying mechanism 23 provided on the ink-jet recording apparatus 1, as depicted in FIG. 1, of the present teaching. Parts or portion in FIG. 2 which are the same as those depicted in FIG. 1 are assigned with the same reference numerals. Note that in FIG. 2, reference numerals 21 and 24 indicate a supply tray and a discharge tray of which illustration are omitted in FIG. 1; a reference numeral 3A indicates a plurality of nozzles formed in the lower surface of the ink-jet head 3. Further, the drying step may be performed at the outside of the ink-jet recording apparatus.

In the drying step, it is allowable, for example, that the weight, of the applied treatment agent at a time at which the treatment agent has been applied (application time), is reduced to be not more than 50% by weight of the application amount at the application time, and may be reduced up to be not more than 30% by weight of the application amount at the application time. The drying step may be expressed also as a solvent-volatilizing step of volatilizing a solvent in the treatment agent (for example, the water, the water-soluble organic solvent, etc.) and/or a weight-reducing step of reducing the weight of the treatment agent.

Next, the water-based ink is jetted to the recording medium from the ink-jet head 3 to thereby print an image on the recording medium. In the present teaching, this image printing step is performed after the treatment agent applying step. According to the present teaching, the transportability of the recording medium is excellent during the printing.

The recording medium on which the image is formed in such a manner is discharged from the ink-jet recording apparatus 1. Note that in FIG. 1, the illustration of a supplying mechanism and a discharging mechanism of the recording medium F are omitted.

The apparatus depicted in FIG. 1 adopts the serial type ink-jet head. However, the present teaching is not limited to this. The ink-jet recording apparatus may be an apparatus which adopts a line type ink-jet head.

In a case that the recording medium is the fabric, the image forming method of the present teaching may further include a washing step of washing the fabric with water; the washing step may be performed after the image printing step. As described above, it is presumed that the colorant contained in the water-based ink is brought in contact with the cationic compound contained in the treatment agent to cause the coagulation, etc., thereby improving the water resistance of the printed matter. On the other hand, if the colorant, which is not coagulated, etc., exists on the fabric, the colorant in such a state is eluted into water with ease. Therefore, the printed matter has no sufficient water resistance. In view of such a situation, by providing the washing step after the image printing step, the colorant which is not coagulated, etc., is washed out from the fabric. Thus, it is possible to enhance the water resistance of the printed matter.

Further, in the washing step, the non-cationic sizing agent applied to the recording surface may be washed by water. Namely, it is allowable to remove the non-cationic sizing agent from the recording surface. Since the non-cationic sizing agent is present on the recording surface during the printing, it is possible to increase the transportability of the recording medium. Further, by removing the non-cationic sizing agent from the recording surface after the above-described image printing step, it is possible to have the hardness of the printed matter return close to the original hardness of the recording medium (fabric).

According to the present teaching, it is possible to realize an excellent water resistance in a printed matter obtained by performing printing on a fabric. Further, according to the present teaching, it is possible, for example, to improve the resistance (water resistance) in such a case that a printed matter obtained by performing recording on a recording paper makes contact with water.

Figure 4:
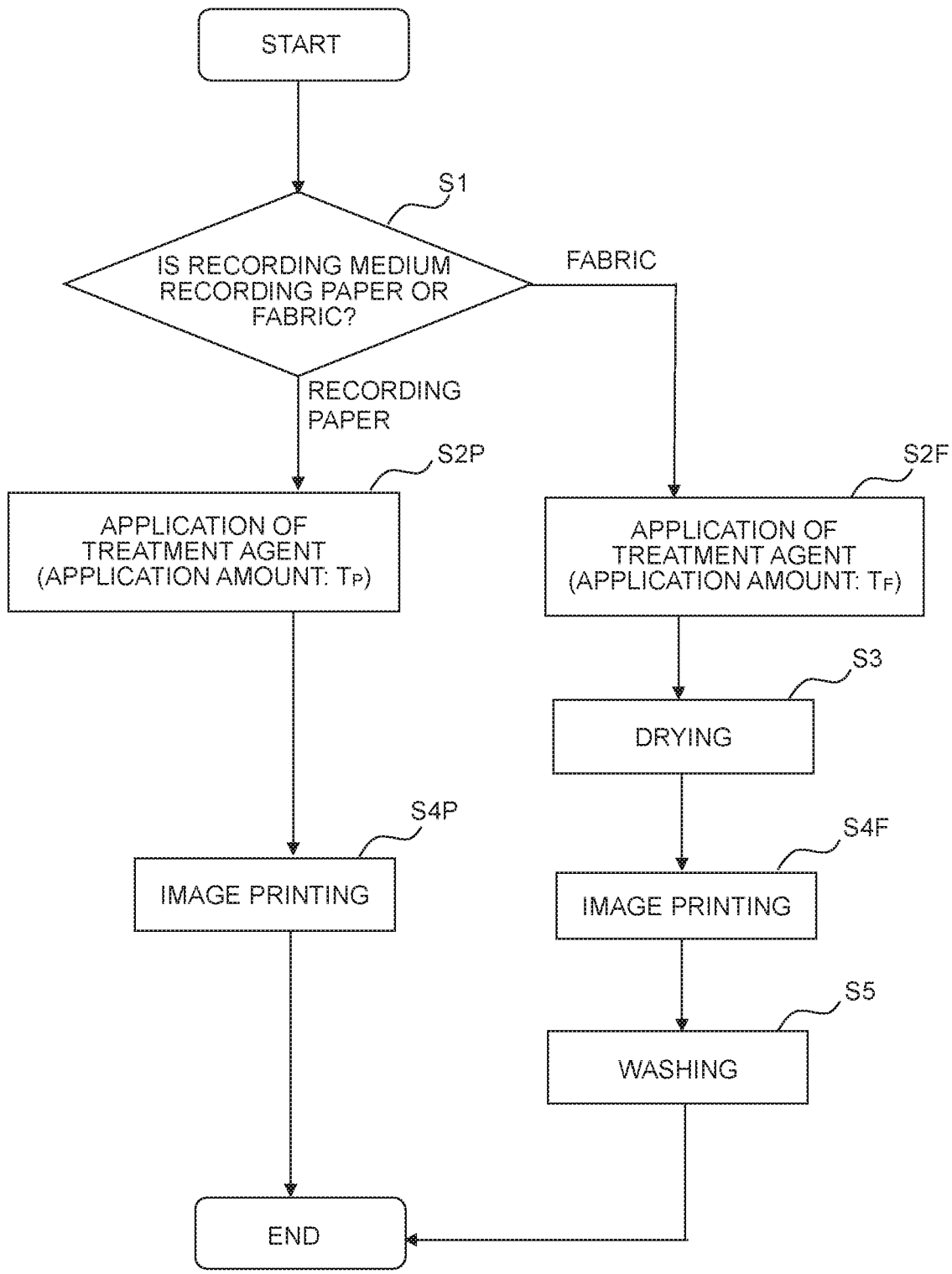
FIG. 4 is a flow chart indicating a recording method of the present teaching.

Next, an explanation will be given about an example of the image forming method of the present teaching, in accordance with a flowchart indicated in FIG. 4. Note that the image forming method which will be explained below is merely an example, and the present teaching is not limited to or restricted by this example. Firstly, depending on the kind of the recording medium (fabric or recording paper), it is determined as to which one of a "fabric printing mode (first recording mode) and a "recording paper printing mode (second recording mode) is to be performed (step S1). For example, the controller 10 may determine as to which one of the first recording mode and the second recording mode is to be performed, in accordance with (based on) a signal inputted from the user interface. Alternatively, the controller 10 may determine as to which one of the first recording mode and the second recording mode is to be performed, in accordance with (based on) a flag corresponding to a mode selected on the user interface.

In a case that the recording medium is the fabric (first recording mode), the treatment agent applying step (step S2F), the drying step (step S3), the image printing step (step S4F), and the washing step (step S5) are performed in this order. On the other hand, in a case that the recording medium is the recording paper (second recording mode), the treatment agent applying step (step S2P) and the image printing step (step S4P) are performed in this order.

The image forming method of the present teaching as described above may be performed by using an ink-jet recording apparatus provided with the treatment-agent applying mechanism and/or the drying mechanism, or may be performed by using an ink-jet recording apparatus which is not provided with the treatment-agent applying mechanism and/or the drying mechanism. In a case that the image forming method is performed by using the ink-jet recording apparatus which is not provided with the treatment-agent applying mechanism and/or the drying mechanism, it is allowable, for example, that a user applies the treatment agent to the recording medium by a spraying method, and/or that the user may dry the treatment agent applied to the fabric with an iron or a dryer.

EXAMPLES

Next, Examples of the present teaching are explained together with Comparative Examples. Note that the present teaching is not limited to or restricted by Examples and Comparative Examples described below.

<Preparation of Treatment Agent>

Respective components of Treating Agent Composition (TABLE 1) were mixed uniformly or homogeneously, and 18 kinds of treatment agents which are treatment agents 1-13 and c1-c5 were obtained.

Table 1 (following)—LEGEND

*1: Weight average molecular weight: 20000; ratio of occupation of urethane structure in solid content: 60% by weight; numerical values in Table indicate solid content amounts

*2: Weight average molecular weight: 3000; ratio of occupation of urethane structure in solid content: 60% by weight; numerical value in Table indicates solid content amount

*3: Weight average molecular weight: 500000; ratio of occupation of urethane structure in solid content: 60% by weight; numerical value in Table indicates solid content amount

*4: Weight average molecular weight: 20000; ratio of occupation of urethane structure in solid content: 10% by weight; numerical value in Table indicates solid content amount

*5: Water-soluble polymer having diallylamines represented by the formula (2) and the units represented by formulae (4) and (5) as constituents of the water-soluble polymer; produced by NITTOBO MEDICAL CO., LTD.; weight average molecular weight: 20000

*6: Water-soluble polymer having diallylamines represented by the formula (2) as a constituent of the water-soluble polymer; produced by SENKA CORPORATION; the weight-average molecular weight: more than 5000 but less than 20000

*7: Lauryl trimethylammonium sulfate

*8: Weight average molecular weight: 20000; ratio of occupation of urethane structure in solid content: 60% by weight; numerical value in Table indicates solid content amount

*9: Produced by DAI-ICHI KOGYO SEIYAKU CO., LTD.

*10: Produced by NISSIN CHEMICAL INDUSTRY CO., LTD.; numerical values in Table indicate active ingredient amounts In TABLE 1, the blending amounts of the non-cationic sizing agent and the cationic sizing agent indicate active ingredient amounts, respectively.

<Preparation of Water-Based Pigment Ink Bk and Water-Based Pigment Ink M>

Respective components of Water-based Ink Compositions (TABLE 2), which were included in Water-based Ink Composition and which were different from CAB-O-JET (trade name) 200 or a water (aqueous) pigment dispersion, were mixed uniformly or homogeneously; and thus an ink solvent was obtained. Subsequently, the ink solvent was added to each of CAB-O-JET (trade name) 200 dispersed in water or the water (aqueous) pigment dispersion followed by being mixed uniformly, and thus a mixture was obtained. After that, the obtained mixture was filtrated through a cellulose acetate membrane filter (pore size 3.00 μm) produced by TOYO ROSHI KAISHA, LTD., and thus water-based pigment ink Bk for ink jet recording and water-based pigment ink M for ink jet recording indicated in TABLE 2 were each obtained.

<Preparation of Water-Based Dye Ink Y and Water-Based Dye Ink C>

Respective components of Water-based Ink Compositions (TABLE 2) were mixed uniformly or homogeneously; and

TABLE 1

| | | | Treatment Agent | | | | | | | | | |
|---|---|---|---|---|---|---|---|---|---|---|---|---|
| | | | 1 | 2 | 3 | 4 | 5 | 6 | 7 | 8 | 9 | |
| Treating Agent Composition (% by weight) | Cationic substance | Urethane acrylic emulsion A (*1) | 10 | 1 | 15 | — | — | — | — | 10 | 10 | |
| | | Urethane acrylic emulsion B (*2) | — | — | — | 10 | — | — | — | — | — | |
| | | Urethane acrylic emulsion C (*3) | — | — | — | — | 5 | — | — | — | — | |
| | | Urethane acrylic emulsion D (*4) | — | — | — | — | — | 10 | — | — | — | |
| | | PAS-84 (*5) | — | — | — | — | — | — | — | — | — | |
| | | UNISENCE FPA (trade name) 100 LU (*6) | — | — | — | — | — | — | — | — | — | |
| | | Quaternary ammonium salt (*7) | — | — | — | — | — | — | 10 | — | — | |
| | | Cationic inorganic fine particles | — | — | — | — | — | — | — | — | — | |
| | Anionic substance | Urethane acrylic emulsion E (*8) | — | — | — | — | — | — | — | — | — | |
| | Non-cationic sizing agent | Sodium alginate | — | — | — | — | — | — | — | — | — | |
| | | Pregelatinized starch | — | — | — | — | — | — | — | — | — | |
| | | CMC (*9) | 3 | 3 | 3 | 3 | 3 | 3 | 3 | 0.2 | 10 | |
| | Cationic sizing agent | Cationized starch | — | — | — | — | — | — | — | — | — | |
| | Humectant | Glycerol | 10 | 10 | 10 | 10 | 5 | 10 | 10 | 10 | 10 | |
| | Penetrant | Triethylene glycol n-butyl ether | 0.5 | 0.5 | 0.5 | 0.5 | 0.5 | 0.5 | 0.5 | 0.5 | 0.5 | |
| | Surfactant | OLFINE (trade name) E1010 (*10) | 0.2 | 0.2 | 0.2 | 0.2 | 0.2 | 0.2 | 0.2 | 0.2 | 0.2 | |
| | | Water | balance | balance | balance | balance | balance | balance | balance | balance | balance | |

| | | | Treatment Agent | | | | | | | | |
|---|---|---|---|---|---|---|---|---|---|---|---|
| | | | 10 | 11 | 12 | 13 | c1 | c2 | c3 | c4 | c5 |
| Treating Agent Composition (% by weight) | Cationic substance | Urethane acrylic emulsion A (*1) | 10 | 10 | — | — | — | — | 10 | 10 | — |
| | | Urethane acrylic emulsion B (*2) | — | — | — | — | — | — | — | — | — |
| | | Urethane acrylic emulsion C (*3) | — | — | — | — | — | — | — | — | — |
| | | Urethane acrylic emulsion D (*4) | — | — | — | — | — | — | — | — | — |
| | | PAS-84 (*5) | — | — | 10 | — | — | — | — | — | — |
| | | UNISENCE FPA (trade name) 100 LU (*6) | — | — | — | 5 | — | — | — | — | — |
| | | Quaternary ammonium salt (*7) | — | — | — | 2 | — | — | — | — | — |
| | | Cationic inorganic fine particles | — | — | — | — | 10 | — | — | — | — |
| | Anionic substance | Urethane acrylic emulsion E (*8) | — | — | — | — | — | 10 | — | — | — |
| | Non-cationic sizing agent | Sodium alginate | 1 | — | — | — | — | — | — | — | — |
| | | Pregelatinized starch | — | 3 | — | — | — | — | — | — | — |
| | | CMC (*9) | — | — | 3 | 3 | 3 | 3 | — | — | 3 |
| | Cationic sizing agent | Cationized starch | — | — | — | — | — | — | 3 | — | — |
| | Humectant | Glycerol | 10 | 10 | 10 | 10 | 10 | 10 | 10 | 10 | 10 |
| | Penetrant | Triethylene glycol n-butyl ether | 0.5 | 0.5 | 0.5 | 0.5 | 0.5 | 0.5 | 0.5 | 0.5 | 0.5 |
| | Surfactant | OLFINE (trade name) E1010 (*10) | 0.2 | 0.2 | 0.2 | 0.2 | 0.2 | 0.2 | 0.2 | 0.2 | 0.2 |
| | | Water | balance | balance | balance | balance | balance | balance | balance | balance | balance | thus a mixture was obtained. After that, the obtained mixture was filtrated through a polytetrafluoroethylene (PTFE)-type membrane filter (pore size 0.20 μm) produced by TOYO ROSHI KAISHA, LTD., and thus water-based dye ink Y for ink-jet recording and water-based dye ink C for ink jet recording indicated in TABLE 2 were each obtained.

Table 2 (following)—LEGEND

*11: Self-dispersible pigment; produced by CABOT CORPORATION; numerical value in Table indicates pigment solid content amount

*12: Aqueous dispersion of C. I. Pigment Red 122 (containing resin dispersing agent); numerical value in Table indicates pigment solid content amount

*13: Produced by LION SPECIALTY CHEMICALS CO., LTD.; numerical values in Table indicate active ingredient amounts Unit of water-based ink composition is % by weight.

TABLE 2

| | | | Bk | M | Y | C1 |
|---|---|---|---|---|---|---|
| Water-based Ink composition (% by weight) | Anionic colorant | CAB-O-JET (trade name) 200 (*11) | 4 | — | — | — |
| | | Aqueous pigment dispersion (*12) | — | 4 | — | — |
| | | C. I. Direct Yellow 86 | — | — | 4 | — |
| | | C. I. Acid Blue 90 | — | — | — | 4 |
| | Humectant | Glycerol | 20 | 20 | 20 | 20 |
| | Penetrant | Triethylene glycol n-butyl ether | 2 | 2 | 2 | 2 |
| | Surfactant | SUNNOL (trade name) NL1430 (*13) | 0.2 | 0.2 | 0.2 | 0.2 |
| | | Water | balance | balance | balance | balance |

Example 1

The treatment agent 1 indicated in Table 1 was uniformly applied by the spray method to a recording surface (image formation surface) of cotton (sheeting) having an A4 size (210 mm×297 mm). In this procedure, the application amount of the treatment agent 1 per unit area was 18 mg/cm$^2$. Subsequently, the applied treatment agent was dried under a condition of 200° C. for 120 seconds by using an iron. Subsequently, an image was printed on the recording surface (image formation surface) of the cotton with the water-based dye ink C indicated in TABLE 2 by using a digital multifunction machine equipped with an ink-jet printer DCP-J4225N produced by BROTHER INDUSTRIES, LTD. In this way, an evaluation sample was prepared.

Examples 2 and 3

Evaluation samples were prepared in the similar manner as in Example 1 except that the application amount of the treatment agent 1 per unit area was changed as indicated in TABLE 3 (as follows).

Examples 4 to 13

Evaluation samples were prepared in the similar manner as in Example 1 except that the treatment agents 2 to 11 indicated in TABLE 1 were used in place of the treatment agent 1.

Example 14

An evaluation sample was prepared in the similar manner as in Example 1 except that the water-based pigment ink Bk as indicated in TABLE 2 was used in place of the water-based dye ink C.

Example 15

An evaluation sample was prepared in the similar manner as in Example 14 except that polyester twill having the same planar size was used in place of the cotton.

Examples 16 and 17

Evaluation samples were each prepared in the similar manner as in Example 1 except that the water-based pigment ink M or the water-based dye ink Y as indicated in TABLE 2 was used in place of the water-based dye ink C.

Examples 18 and 19

Evaluation samples were each prepared in the similar manner as in Example 1 except that the treatment agent 12 or 13 as indicated in TABLE 1 was used in place of the treatment agent 1.

Comparative Example 1

An evaluation sample was prepared in the similar manner as in Example 1 except that the treatment agent c1 as indicated in TABLE 1 was used in place of the treatment agent 1.

Comparative Example 2

An evaluation sample was prepared in the similar manner as in Comparative Example 1 except that polyester twill having the same planar size was used in place of the cotton.

Comparative Examples 3 to 6

Evaluation samples were prepared in the similar manner as in Example 1 except that the treatment agents c2 to c5 as indicated in TABLE 1 were used in place of the treatment agent 1.

Comparative Example 7

An evaluation sample was prepared in the similar manner as in Example 1 except that the treatment agent was not applied.

With respect to each of Examples 1 to 19 and Comparative Examples 1 to 7, (a) Evaluation of water resistance, (b) Evaluation of transportability of recording medium during printing, and (c) Evaluation of hardness of recording medium were performed by the following methods.

(a) Evaluation of Water Resistance

The evaluation sample was washed with water for 5 minutes while shaking the evaluation sample to such an extent that a part of the evaluation sample was not rubbed with other parts, of the evaluation sample, in water. The optical density (OD value) of the evaluation sample obtained by being dried after the washing with water was measured by using a spectrophotometer Spectro Eye produced by X-RITE (light source: $D_{50}$, field angle: 2°, ANSI-T) to calculate the difference (ΔOD) in the optical density (OD value) before and after the washing with water (ΔOD=OD value before washing with water−OD value after washing with water). It is possible to judge that the smaller ΔOD is, the more excellent the water resistance is.

(b) Evaluation of Transportability of Recording Medium During Printing

The transportability of the evaluation sample in the digital multifunction machine equipped with the ink-jet printer DCP-J4225N was evaluated in accordance with the following evaluation criterion.

<Criterion for Evaluation of Transportability of Recording Medium During Printing>

AA: The rate of occurrence of transportation failure (conveyance failure, such as jam, etc.) is less than 5%.

A: The rate of occurrence of transportation failure (conveyance failure, such as jam, etc.) is in a range of not less than 5% to less than 10%.

C: The rate of occurrence of transportation failure (conveyance failure, such as jam, etc.) is not less than 10%.

(c) Evaluation of Hardness of Recording Medium

The evaluation sample was washed and dried in a similar manner to (a) Evaluation of Water Resistance. After the drying, the evaluation sample was adjusted to have a size of 5 cm×15 cm, with direction of the loom or weave in the fabric as the long side. Similarly, the cotton (sheeting) or the polyester twill before the application of the treatment agent was also adjusted to have the size of 5 cm×15 cm, to be prepared as a comparison sample. In each of the evaluation sample and the comparison sample, an end portion of 5 cm in the long side of 15 cm was placed on a surface of a flat desk, and the remaining portion of 10 cm was allowed to hang down from the flat desk surface; in this situation, an angle between a direction perpendicular to the flat surface of the desk and the remaining 10 cm portion of each of the evaluation sample and the comparison sample was obtained, and evaluation was performed in accordance with the following evaluation criterion. Note that in the following criterion for the evaluation of hardness of the recording medium, as the difference between the angle in an evaluation sample and the angle in the comparison sample is smaller, the hardness of the washed printed matter returns closer to the original hardness of the recording medium (fabric).

<Criterion for Evaluation of Hardness of Recording Medium>

AA: The difference in the above-described angle between the evaluation sample and the comparison sample is less than 10 degrees.

A: The difference in the above-described angle between the evaluation sample and the comparison sample is in a range of not less than 10 degrees to less than 20 degrees.

C: The difference in the above-described angle between the evaluation sample and the comparison sample is not less than 20 degrees.

TABLES 3 and 4 indicate the types of the treatment agent and the water-based ink used in Examples 1 to 19 and Comparative Examples 1 to 7, the application amount of the treatment agent, and the evaluation results.

TABLE 3

|  | Example | | | | | | |
|---|---|---|---|---|---|---|---|
|  | 1 | 2 | 3 | 4 | 5 | 6 | 7 |
| Treatment agent | 1 | 1 | 1 | 2 | 3 | 4 | 5 |
| Water-based ink | C | C | C | C | C | C | C |
| Application amount of treatment agent (mg/cm$^2$) | 18 | 48 | 5 | 18 | 18 | 18 | 18 |
| Water resistance (ΔOD in cotton before and after washing) | 0.03 | 0.01 | 0.09 | 0.08 | 0.01 | 0.02 | 0.02 |
| Water resistance (ΔOD in polyester before and after washing) | — | — | — | — | — | — | — |
| Transportability of recording medium during printing | AA | AA | A | AA | AA | AA | AA |
| Hardness of recording medium | AA | A | AA | AA | AA | AA | AA |

|  | Example | | | | | |
|---|---|---|---|---|---|---|
|  | 8 | 9 | 10 | 11 | 12 | 13 |
| Treatment agent | 6 | 7 | 8 | 9 | 10 | 11 |
| Water-based ink | C | C | C | C | C | C |
| Application amount of treatment agent (mg/cm$^2$) | 18 | 18 | 18 | 18 | 18 | 18 |
| Water resistance (ΔOD in cotton before and after washing) | 0.03 | 0.07 | 0.02 | 0.03 | 0.03 | 0.03 |
| Water resistance (ΔOD in polyester before and after washing) | — | — | — | — | — | — |

TABLE 3-continued

| | | | | | | |
|---|---|---|---|---|---|---|
| Transportability of recording medium during printing | AA | AA | A | AA | AA | AA |
| Hardness of recording medium | AA | AA | AA | A | AA | AA |

| | Example | | | | | |
|---|---|---|---|---|---|---|
| | 14 | 15 | 16 | 17 | 18 | 19 |
| Treatment agent | 1 | 1 | 1 | 1 | 12 | 13 |
| Water-based ink | Bk | Bk | M | Y | C | C |
| Application amount of treatment agent (mg/cm$^2$) | 18 | 18 | 18 | 18 | 18 | 18 |
| Water resistance (ΔOD in cotton before and after washing) | 0.02 | — | 0.02 | 0.02 | 0.04 | 0.04 |
| Water resistance (ΔOD in polyester before and after washing) | — | 0.04 | — | — | — | — |
| Transportability of recording medium during printing | AA | AA | AA | AA | AA | AA |
| Hardness of recording medium | AA | AA | AA | AA | AA | AA |

TABLE 4

| | Comparative Example | | | | | | |
|---|---|---|---|---|---|---|---|
| | 1 | 2 | 3 | 4 | 5 | 6 | 7 |
| Treatment agent | c1 | c1 | c2 | c3 | c4 | c5 | — |
| Water-based ink | C | C | C | C | C | C | C |
| Application amount of treatment agent (mg/cm$^2$) | 18 | 18 | 18 | 18 | 18 | 18 | — |
| Water resistance (ΔOD in cotton before and after washing) | 0.03 | — | 0.48 | 0.01 | 0.02 | 0.46 | 0.45 |
| Water resistance (ΔOD in polyester before and after washing) | — | 0.05 | — | — | — | — | — |
| Transportability of recording medium during printing | AA | AA | AA | AA | C | AA | C |
| Hardness of recording medium | C | C | AA | C | AA | AA | AA |

As indicated in TABLE 3, the results of the evaluations of the water resistance, the transportability of recording medium during printing and the hardness of the recording medium were all satisfactory in each of Examples 1 to 19.

Example 1 in which the application amount of the treatment agent was made to be in a range of 10 mg/cm$^2$ to 36 mg/cm$^2$ (18 mg/cm$^2$) had further satisfactory result in the evaluation of the hardness of recording medium than that in Example 2 which had similar condition as that of Example 1 except that the application amount of the treatment agent was 48 mg/cm$^2$, and Example 1 had further satisfactory results in the evaluation of the transportability of recording medium during printing and in the evaluation of the water resistance than that in Example 3 which had similar condition as that of Example 1 except that the application amount of the treatment agent was 5 mg/cm$^2$.

In Examples 1 and 5 in each of which the blending amount of the cationic substance was not less than 10% by weight had further satisfactory result in the evaluation of the water resistance than that in Example 4 which had a similar condition except that the blending amount of the cationic substance was 1% by weight.

In Examples 1, 6 and 8 each of which used the urethane acrylic emulsion as the cationic substance had further satisfactory result in the evaluation of the water resistance than that in Example 9 which had a similar condition except that Example 9 used the quaternary ammonium salt as the cationic substance.

In Example 1 in which the blending amount of the non-cationic sizing agent was made to be in a range of 1% by weight to 5% by weight (3% by weight) had further satisfactory result in the evaluation of the transportability of recording medium during printing than that in Example 10 which had a similar condition as that in Example 1 except that the blending amount of the non-cationic sizing agent was 0.2% by weight, and Example 1 had further satisfactory result in the evaluation of the hardness of recording medium than that in Example 11 which had a similar condition as that in Example 1 except that the blending amount of the non-cationic sizing agent was 10% by weight.

On the other hand, as indicated in TABLE 4, Comparative Examples 1 and 2 each of which used cationic inorganic fine particles as the cationic substance had unsatisfactory result in the evaluation of the hardness of recording medium. Further, Comparative Example 3 which used an anionic substance instead of using the cationic substance had unsatisfactory result in the evaluation of the water resistance. Furthermore, Comparative Example 4 which used a cationic sizing agent instead of using the non-cationic sizing agent had unsatisfactory result in the evaluation of the hardness of recording medium. Moreover, Comparative Example 5 which did not use the non-cationic sizing agent had unsatisfactory result in the evaluation of the transportability of recording medium during printing. Further, Comparative Example 6 which did not use the cationic substance had unsatisfactory result in the evaluation of the water resistance. Furthermore, Comparative Example 7 which did not use the treatment agent had unsatisfactory results in the evaluation of the water resistance and in the evaluation of the transportability of recording medium during printing.

Example 20

The treatment agent 1 indicated in Table 1 was uniformly applied by the spray method to a recording surface (image formation surface) of recording paper ("SUPER WHITE+" manufactured by ASKUL CORPORATION). In this procedure, the application amount of the treatment agent 1 per the unit area was 0.3 mg/cm$^2$. Subsequently, the applied treatment agent was dried by performing air drying (natural drying) for 10 minutes. Subsequently, an image was printed on the recording surface (image formation surface) of the recording paper with the water-based dye ink C indicated in TABLE 2 by using the digital multifunction machine equipped with the ink-jet printer DCP-J4225N. In this way, an evaluation sample was prepared.

Examples 21 and 22

Evaluation samples were prepared in the similar manner as in Example 20 except that the application amount of the treatment agent 1 per the unit area was changed as indicated in TABLE 5 (as follows).

With respect to Examples 20 to 22, (a) the measurement of the optical density (OD value), (b) the evaluation of the hardness of recording medium and (c) the curl evaluation were carried out in accordance with the following methods.

(a) Measurement of Optical Density (OD Value)

The optical density (OD value) of the evaluation sample was measured with the spectrophotometer, SpectroEye (light source: $D_{50}$; field: 2°; density reference: ANSI-T).

(b) Evaluation of Hardness of Recording Medium

The evaluation of hardness of recording medium was performed in a similar manner as in Examples 1 to 19 and Comparative Examples 1 to 7 except that the evaluation samples were not washed, in accordance with the following evaluation criterion. Note that in the following criterion for the evaluation of hardness of the recording medium, as the difference between the angle in the evaluation sample and the angle in the comparison sample is larger, toughness or stiffness of the recording medium (recording paper) is higher and the printed matter has higher quality.

<Criterion for Evaluation of Hardness of Recording Medium>

AA: The difference in the above-described angle between the evaluation sample and the comparison sample is not less than 20 degrees.

A: The difference in the above-described angle between the evaluation sample and the comparison sample is in a range of not less than 10 degrees to less than 20 degrees.

(c) Curl Evaluation

The curl (degree of warpage) of the recording paper (A4 size (210 mm×297 mm)) applied with the treatment agent and after the air drying was observed by means of the visual observation. The evaluation was made in accordance with the following evaluation criterion.

<Criterion for Curl Evaluation>

AA: Curl (warpage) of recording paper was scarcely observed.

A: Curl (warpage) was slightly observed at end portion of recording paper.

TABLE 5 indicates the types of the treatment agent and the water-based ink used in Examples 20 to 22, the application amount of the treatment agent, and the evaluation results.

TABLE 5

|  | Example | | |
|---|---|---|---|
|  | 20 | 21 | 22 |
| Treatment agent | 1 | 1 | 1 |
| Water-based ink | C | C | C |
| Application amount of treatment agent (mg/cm$^2$) | 0.3 | 0.6 | 1.3 |
| Optical density (OD value) | 1.09 | 1.10 | 1.17 |
| Hardness of recording medium | AA | AA | AA |
| Curl | AA | AA | A |

As indicated in TABLE 5, the optical density (OD value) was high in each of Examples 20 to 22, and the results of the evaluations of the hardness of the recording medium and the curl evaluation were satisfactory in each of Examples 20 to 22. In Examples 20 and 21 in each of which the application amount of the treatment agent was not more than 0.6 mg/cm$^2$ had further excellent result in the curl evaluation than that of Example 22 in which the application amount of the treatment agent was 1.3 mg/cm$^2$.

A part or all of the embodiments and Examples described above can be also described as follows. However, the present teaching is not limited to the following description.

There is provided a treatment agent applicable to a recording surface of a recording medium which is recording paper or fabric; the treatment agent may contain: a cationic substance; and a non-cationic sizing agent. The cationic substance may be at least one selected from the group consisting of: a cationic polymer capable of forming a flexible film in a case that the cationic polymer is dried, a cationic surfactant, a polyvalent metal salt and a polyvalent metal ion.

In the treatment agent, the blending amount of the cationic substance in an entire amount of the treatment agent may be in a range of 1% by weight to 15% by weight.

In the treatment agent, the cationic substance may be a cationic polymer having a urethane structure.

In the treatment agent, a ratio of the urethane structure (a ratio of occupation of the urethane structure) may be not less than 10% in the cationic polymer having the urethane structure.

In the treatment agent, the ratio of the urethane structure may be not less than 20% in the cationic polymer having the urethane structure.

In the treatment agent, the cationic polymer having the urethane structure may be an emulsion.

In the treatment agent, the cationic polymer having the urethane structure may have at least one of an acrylic structure and a styrene structure in a part, of the cationic polymer having the urethane structure, which is different from the urethane structure.

In the treatment agent, the cationic polymer having the urethane structure may have the acrylic structure in the part, of the cationic polymer having the urethane structure, which is different from the urethane structure.

In the treatment agent, the weight average molecular weight of the cationic polymer having the urethane structure may be in a range of 1,000 to 500,000.

In the treatment agent, the weight average molecular weight of the cationic polymer having the urethane structure may be in a range of 3,000 to 500,000.

In the treatment agent, the urethane structure in the cationic polymer having the urethane structure may be obtained by: an aliphatic isocyanate; and a polyether polyol or polyester polyol.

In the treatment agent, the cationic substance may be a water-soluble polymer having diallylamines represented by the following formula (2) as a constituent of the water-soluble polymer:

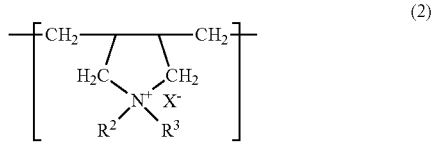

wherein in the formula (2), $R^2$ and $R^3$ may be each an alkyl group, the $R^2$ and the $R^3$ may be identical with each other or different from each other, the alkyl group may have a substituent group and may be a straight-chain or branched-chain alkyl group;

$X^-$ may be an anion; and a number (n) of the constituent represented by the formula (2) in the water-soluble polymer is in a range of 5 to 1000.

In the treatment agent, a blending amount of the non-cationic sizing agent in the entire amount of the treatment agent may be in a range of 0.2% by weight to 10% by weight.

In the treatment agent, the non-cationic sizing agent may be at least one selected from the group consisting of: sodium alginate, pregelatinized starch and carboxymethyl cellulose.

In a case that the recording medium is the recording paper, an application amount of the treatment agent per unit area may be not more than 1.3 mg/cm$^2$; and in a case that the recording medium is the fabric, the application amount of the treatment agent per unit area may be in a range of 5.0 mg/cm$^2$ to 48 mg/cm$^2$.

In a case that the recording medium is the fabric, the non-cationic sizing agent applied to the recording surface may be washed by water.

An ink set may include a water-based ink for ink-jet recording and a treatment agent, wherein the water-based ink may contain an anionic coloring agent and water; and the treatment agent may be the treatment agent as described above.

There is provided an image forming method for using the ink set as described above so as to form an image on a recording surface of a recording medium which is recording paper or fabric, and the image forming method may include:

a treatment agent applying step of applying the treatment agent to the recording surface of the recording medium; and an image printing step of performing printing of the image by jetting the water-based ink by means of an ink-jet system onto the recording surface of the recording medium to which the treatment agent has been applied.

The image forming method may further include a drying step of drying the applied treatment agent.

In the drying step of the image forming method, the weight, of the applied treatment agent at a time at which the treatment agent has been applied (application time), may be reduced up to be not more than 50% by weight of the application amount at the application time.

In the drying step of the image forming method, the weight, of the applied treatment agent at a time at which the treatment agent has been applied (application time), may be reduced up to be not more than 30% by weight of the application amount at the application time.

In the image forming method, a drying temperature in the drying step may be in a range 130° C. to 220° C.

In the image forming method, the treatment agent applying step, the drying step and the image printing step may be performed in this order.

In the image forming method, in a case that the recording medium is the fabric, the image forming method may further include a washing step of washing the fabric with water; and the washing step may be performed after the image printing step.

An ink-jet recording apparatus may include:

an ink set accommodating section;

a treatment agent applying mechanism; and an ink jetting mechanism, wherein the ink set as described above may be accommodated in the ink set accommodating section;

the treatment agent constructing the ink set may be applied to a recording surface of the recording medium by the treatment agent applying mechanism; and the water-based ink constructing the ink set may be jetted onto the recording surface of the recording medium by the ink jetting mechanism.

The ink-jet recording apparatus may further include a control mechanism, wherein the control mechanism may control application of the treatment agent which is performed by the treatment agent applying mechanism.

The ink-jet recording apparatus may further include a drying mechanism, wherein the driving mechanism may dry the recording medium after the treatment agent has been applied to the recording medium.

As described above, the treatment agent of the present teaching is capable of improving the transportability of recording medium during printing and the water resistance of the printed matter. The way of use of the treatment agent of the present teaching is not specifically limited, and is widely applicable to the image formation on a variety of kinds of recording media.

What is claimed is:

1. A treatment agent applicable to a recording surface of a recording medium which is recording paper or fabric, the treatment agent comprising:

a non-cationic sizing agent; and at least one cationic substance which is selected from the group consisting of: a cationic polymer capable of forming a flexible film in a case that the cationic polymer is dried, and a cationic surfactant, wherein the cationic polymer is a cationic polymer having a urethane structure or a water-soluble polymer having diallylamines represented by the following formula (2) as a constituent of the water-soluble polymer:

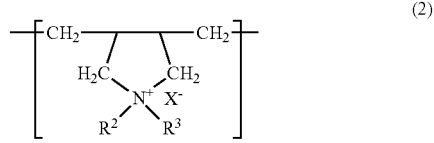

wherein in the formula (2), $R^2$ and $R^3$ are each a substituted or non-substituted, straight-chain or branched-chain alkyl group, and the $R^2$ and the $R^3$ are identical with each other or different from each other;

$X^-$ is an anion, and wherein a number of the constituent represented by the formula (2) in the water-soluble polymer is in a range of 5 to 1000.

2. The treatment agent according to claim 1, wherein a blending amount of the cationic substance in an entire amount of the treatment agent is in a range of 1% by weight to 15% by weight.

3. The treatment agent according to claim 1, wherein a blending amount of the cationic substance in an entire amount of the treatment agent is in a range of 10% by weight to 15% by weight.

4. The treatment agent according to claim 1, wherein the cationic polymer is the cationic polymer having a urethane structure.

5. The treatment agent according to claim 4, wherein a ratio of the urethane structure is not less than 10% by weight in the cationic polymer having the urethane structure.

6. The treatment agent according to claim 4, wherein the treatment agent contains an emulsion of the cationic polymer having the urethane structure.

7. The treatment agent according to claim 4, wherein the cationic polymer having the urethane structure further has at least one of an acrylic structure and a styrene structure.

8. The treatment agent according to claim 7, wherein the cationic polymer having the urethane structure has the acrylic structure.

9. The treatment agent according to claim 4, wherein the urethane structure is obtained by:
   an aliphatic isocyanate; and
   a polyether polyol or polyester polyol.

10. The treatment agent according to claim 1, wherein the cationic polymer is the water-soluble polymer having diallylamines represented by the formula (2) as a constituent of the water-soluble polymer.

11. The treatment agent according to claim 10, wherein the $R^2$ and the $R^3$ in the formula (2) are each a methyl group; and
   the $X^-$ is a methylsulfate ion or a chloride ion.

12. The treatment agent according to claim 1, wherein a blending amount of the non-cationic sizing agent in an entire amount of the treatment agent is in a range of 0.2% by weight to 10% by weight.

13. The treatment agent according to claim 1, wherein a blending amount of the non-cationic sizing agent in an entire amount of the treatment agent is in a range of 1% by weight to 5% by weight.

14. The treatment agent according to claim 1, wherein the non-cationic sizing agent is at least one selected from the group consisting of: sodium alginate, pregelatinized starch and carboxymethyl cellulose.

15. The treatment agent according to claim 1, wherein a ratio (X/Y) of a blending amount (X: % by weight) of the cationic substance to a blending amount (Y: % by weigh) of the non-cationic sizing agent is in a range of 3.3 to 5.

16. The treatment agent according to claim 1, wherein in a case that the recording medium is the recording paper, an application amount of the treatment agent per unit area of the recording surface is not more than 1.3 $mg/cm^2$; and
   in a case that the recording medium is the fabric, the application amount of the treatment agent per the unit area of the recording surface is in a range of 5.0 $mg/cm^2$ to 48 $mg/cm^2$.

17. A treatment agent applicable to a recording surface of a recording medium which is recording paper or fabric, the treatment agent comprising:
   a non-cationic sizing agent; and
   at least one cationic substance which is selected from the group consisting of: a cationic polymer capable of forming a flexible film in a case that the cationic polymer is dried, a cationic surfactant, a polyvalent metal salt and a polyvalent metal ion,
   wherein in a case that the recording medium is the fabric, the non-cationic sizing agent applied to the recording surface is washed by water.

18. An ink set comprising:
   a water-based ink for ink-jet recording containing an anionic coloring agent and water; and
   the treatment agent as defined in claim 1.

* * * * *